Patented Feb. 27, 1951

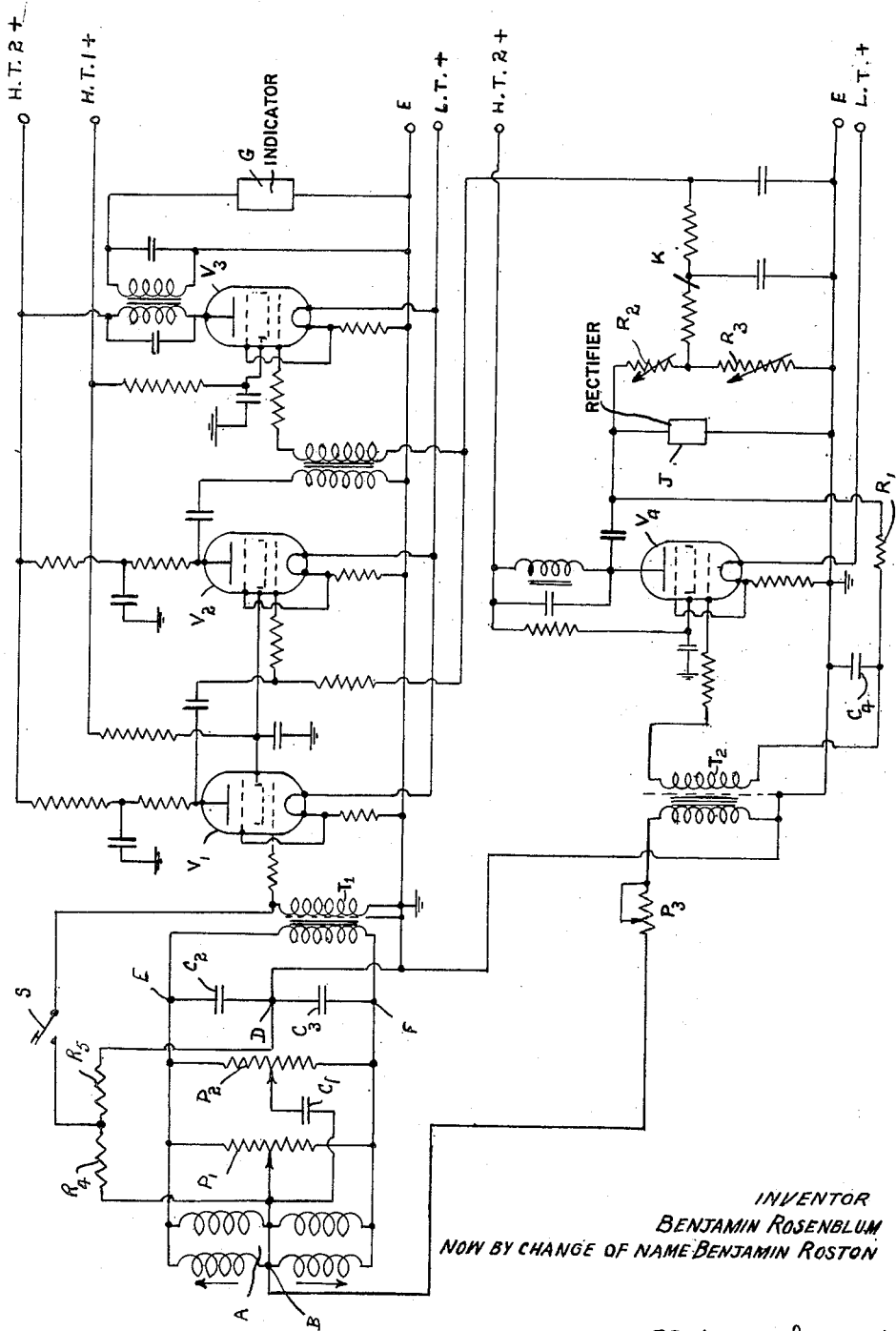

2,543,469

UNITED STATES PATENT OFFICE 2,543,469

MEASURING APPARATUS, INCLUDING MEANS FOR CONTROLLING AUTOMATICALLY THE GAIN OF AN AMPLIFIER

Benjamin Rosenblum, London, England, now by change of name Benjamin Roston

Application January 9, 1946, Serial No. 640,115
In Great Britain January 24, 1945

3 Claims. (Cl. 171—95)

1

The present invention relates to means for controlling automatically the gain of an amplifier, and particularly an amplifier to which is applied a complex input comprising two or more components differing in frequency or phase or derived from different sources and when it is desired to observe one component as a function of one or more of the other components or of the total input.

Examples of such cases are:

(1) In electrical measuring instruments, such as ohm-meters, where the ratio of two components is measured or dynamometers where the product of two components is measured.

(2) Where the quantity to be measured is the ratio of a desired signal or other component and an undesired signal or noise and it is desired that this ratio should be measured independently of variations in the respective amplitudes.

(3) Where it is desired to measure one component which is partly a function of another component. An example is where it is desired to determine the measure of the distortion or variation of an electric or magnetic field and where the mean value of the field is not constant over the region or period of measurement. Another example is where it is desired to determine the measure of the amplitude of a harmonic in the presence of the fundamental and where it is desired to eliminate from the measurement such changes in amplitude of the harmonic as are a single value function of the changes in amplitude of the fundamental.

It is the object of the present invention to provide improved means for making the measurements above referred to and other measurements of analogous kind.

According to the present invention in apparatus which has applied to it a complex input, where it is desired substantially to eliminate from the measurement of one component of the input variations which are a single value function of a second component of the input, the second component is applied to a compensator comprising one or more thermionic valves or other electronic devices having a gain control feedback from its output side to its input side and a D. C. voltage from the output side of the compensator is applied to control the amplification of an amplifier connected to amplify the first component.

By using suitable, preferably similar, valves in the compensator and the amplifier the relation between the D. C. voltage and the amplification of the amplifier, however complicated, can be reproduced in the compensator, thus assuring a

2 constant output of the amplifier for a constant ratio between the inputs of the amplifier and the compensator. By suitably adjusting the ratio of the D. C. voltage fed to the amplifier to that fed back to the input of the compensator and by selecting the number of amplifier and compensator stages controlled, a constant amplifier output can be obtained with any desired relation between amplifier and compensator inputs.

The invention will be described by way of example with reference to the accompanying drawing which is a circuit diagram of search equipment for measuring the distortion of a magnetic field independently of variations in the mean value of the field.

In the drawing there is shown a search unit A of four coils connected as indicated to a resistance-capacitance balancing circuit $P_1 C_1 P_2$ and to two equal capacitors $C_2$ and $C_3$ with their junction D earthed. The outer terminals of these capacitors are designated E and F. The coils are rigidly fixed in horizontal planes relatively to one another and the nature and disposition of the coils and their connections are such that, when located in an alternating magnetic field generated in the area to be searched, in the absence of distortion of the field due to a buried body, the potential difference between points E and F is zero. Fine adjustment of balance can be obtained with the aid of the resistance-capacitance balancing circuit $P_1$, $C_1$, $P_2$.

When the coil unit A is moved near to a buried conductor or magnetic body, the field distortion gives rise to a voltage between points E and F and this voltage is applied through a transformer $T_1$ to an amplifier comprising variable-mu valves $V_1$, $V_2$ and $V_3$ and an indication is given in an indicating device G which may be a telephone receiver. When there are variations in the mean value of the magnetic field in the area being searched, as will usually be the case, the indications given at G will vary correspondingly and it will be impossible to determine the depth of the body by the strength of the indication. In other words the electrical voltage variations between points E and F will contain a first component (which it is desired to measure) dependent upon the depth and other characteristics of the buried conductor modulated by a second component (which it is desired to eliminate from the measurement) which depends upon the variations in the mean value of the magnetic field. It is therefore required to render the sensitivity of the indication independent of variations in the mean field strength in order to eliminate the second component from the measurement and to this end the amplification of the amplifier is varied inversely as to the mean field strength in the following manner:

There is developed between the center point B of the coil system A and the point D a potential difference proportional to the mean value of the magnetic field in which the coil unit A is located. Thus the circuit between the search unit A and the transformer $T_1$ and $T_2$ is designed to separate from one another two components, one of which appearing between points E and F represents the desired constituent (namely a voltage dependent upon the depth and other characteristics of the buried conductor) varying as a single valve function of the mean magnetic field, and the other appearing between points B and D which is a voltage varying only in dependence upon the variations in the value of the mean magnetic field. The voltage between points B and D is applied through a transformer $T_2$ to a compensator comprising a variable-mu valve $V_4$. A D. C. voltage dependent upon the applied alternating input is developed across a rectifier of suitable impedance relatively to that of the valve $V_4$ and this voltage is applied as bias to the grid of the valve $V_4$ through a smoothing circuit comprising a resistor $R_1$ and capacitor $C_4$. A part of the D. C. voltage is tapped off between resistors $R_2$ and $R_3$ and applied through a resistance-capacitance smoothing circuit K to the control or other suitable grids of one or more of the valves of the main amplifier, in the example shown to the control grids of valves $V_2$ and $V_3$. The valve $V_4$ is preferably chosen to have the same characteristics as the valves $V_2$ and $V_3$ of which it controls the amplification so that the relation between the control bias applied to valves $V_2$ and $V_3$ and the amplification of these valves is substantially identical with the same relation in the compensator valve $V_4$. By suitably adjusting the ratio of the D. C. voltage fed back to the grid of valve $V_4$ to the D. C. voltage fed to the grids of valves $V_2$ and $V_3$, the amplifier output can be made independent of the voltage applied to the compensator, that is to say independent of the mean field strength. The desired conditions can be obtained by adjusting the tapping on an input variable resistor $P_3$ associated with the compensator valve $V_4$, by adjusting the relative values of resistors $R_2$ and $R_3$ and by selecting the number of stages controlled in the main amplifier and compensator.

It will be understood that the input to the compensator is substantially proportional to the magnetic field strength. The input to the amplifier, on the other hand, is the voltage picked up by the search coils which voltage is proportional to the field distortion and varies as a function of the magnetic field strength. In order to remove from the output of the amplifier the effects of variations in the distortion due to the variations in magnetic field, the rectified output of the compensator is applied to bias the main amplifier in such a manner that the gain of the main amplifier is reduced proportionately with increase in magnetic field strength. For this purpose the reduction in amplification of the main amplifier cannot be made proportional to the bias voltage but must follow a more complicated relation.

Thus if the alternating input voltage to the amplifier is $v_a$, the alternating input voltage to the compensator is $v_c$, the alternating output voltage from the amplifier is $a$, the direct output voltage from the compensator is $c$, the amplification of the amplifier is $b$, if $p$ and $q$ are functions such that $b=p(c)$ and $c=q(v_c)$ and if the requirement is that $a=v_a h(v_c)$, where $h$ is another function, then $a=bv_a=v_a p(c)=v_a p[q(v_c)]$ and therefore $p[q(v_c)]=h(v_c)$ or $q(v_c)=p^{-1}[h(v_c)]$. In the present case the function $h$ is the reciprocal so that $h(v_c)=1/v_c$, whence $q(v_c)=p=1[1/v_c]$.

In order to enable the operator to check the performance of the compensator and amplifier there may be provided a switch S connected between the junction of two resistors $R_4$ and $R_5$, which are bridged between points B and D, and the grid circuit of the valve $V_1$. When this switch is closed, points E and F are effectively short-circuited by the resistor $R_5$ which is coupled across points E and F by the transformer $T_1$ and there is applied to the input of the amplifier a voltage proportional to that between points B and D. Thus it is possible to observe the variation, if any, in indication at G corresponding to a variation in the absolute values of amplifier and compensator inputs, while their ratio remains constant.

It will be appreciated that the above arrangement has been described by way of example only and may be modified in various ways within scope of the invention. Thus the control voltage applied to the amplifier need not necessarily be constant, but may if preferred, take the form of a pulse or some other modulating potential which will affect the sensitivity of the main amplifier.

One example is where the compensator input applied between the terminal B and earth comprises a radio-frequency potential modulated at an audio-frequency and where the audio-frequency potential obtained across the resistors $R_2$ and $R_3$ after detection is applied as shown in the drawing or in any other suitable way to control the amplification at the audio frequency of the main amplifier to the input of which is fed an oscillation different from that fed to the input of the compensator.

I claim:

1. Measuring apparatus for producing an indication of the product of a first voltage and the $n$th power of a second voltage where $n$ is a real number of modulus one, said voltages being other than proportional to one another, comprising first and second sources of said voltages respectively, an amplifier, means for applying said first voltage to the input of said amplifier, indicating means associated with the output of said amplifier, a compensator, both said amplifier and said compensator comprising at least one variable-mu electron discharge device in which the logarithm of the gain is approximately proportional to the value of a bias voltage applied to a control electrode thereof, and a rectifier connected so as to rectify the output of the discharge device of said compensator, means for applying the voltage from said second source to the input of said compensator, means for applying a rectified voltage from said rectifier to said electrode of the discharge device of said compensator in a sense to decrease the gain of said last-named discharge device, in response to an increase in the voltage of said second source, and means for applying a rectified voltage from said rectifier to said electrode of the discharge device of said amplifier so as to control the gain thereof and so as to render the voltage applied to said indicating means proportional to said product.

2. Measuring apparatus for producing an indication proportional to the ratio of two different voltages which are other than proportional to one another, comprising first and second sources of said voltages respectively, an amplifier, means for applying said first voltage to the input of said amplifier, indicating means associated with the output of said amplifier, a compensator, both said amplifier and said compensator comprising at least one variable-mu electron discharge device in which the logarithm of the gain is approximately proportional to the value of a bias voltage applied to a control electrode thereof, and a rectifier connected so as to rectify the output of the discharge device of said compensator, means for applying the voltage from said second source to the input of said compensator, means for applying a rectified voltage from said rectifier to said electrode of the discharge device of said compensator in a sense to decrease the gain of said last-named discharge device in response to an increase in the voltage of said second source, and means for applying a rectified voltage from said rectifier to said electrode of the discharge device of said amplifier so as to control the gain thereof in a sense to decrease the gain of this discharge device, in response to an increase in the last-named rectified voltage, whereby the voltage applied to said indicating means is proportional to the said ratio.

3. Apparatus for measuring the ratio of the distortion of a magnetic field to the mean value of such field comprising a search coil arrangement to develop a voltage $(a-b)$ dependent upon the difference between the magnetic field intensity at spaced points, a balancing circuit, means for coupling said coil arrangement to said balancing circuit so as to generate between two terminals thereof a voltage proportional to $(a+b)$, an amplifier, means for applying the first-named voltage to the input of said amplifier, indicating means associated with the output of said amplifier, a compensator, both said amplifier and said compensator comprising at least one variable-mu electron discharge device in which the logarithm of the gain is approximately proportional to the value of a bias voltage applied to a control electrode thereof, and a rectifier connected so as to rectify the output of the discharge device of said compensator, means for coupling said terminals to the input of said compensator, means for applying a rectified voltage from said rectifier to said electrode of the discharge device of said compensator in a sense to decrease the gain of said last-named discharge device in response to an increase in the voltage at said terminals, and means for applying a rectified voltage from said rectifier to said electrode of the discharge device of said amplifier so as to control the gain thereof in a sense to decrease the gain of this discharge device, in response to an increase in the last-named rectified voltage.

BENJAMIN ROSENBLUM.

REFERENCES CITED

The following references are of record in the file of this patent:

UNITED STATES PATENTS

| Number | Name | Date |
|---|---|---|
| 2,065,826 | Roosenstein et al. | Dec. 29, 1936 |
| 2,112,595 | Farnham | Mar. 29, 1938 |
| 2,147,729 | Wurmser | Feb. 21, 1939 |
| 2,152,618 | Wheeler | Mar. 28, 1939 |
| 2,286,106 | Ritzmann | June 9, 1942 |
| 2,312,260 | Miller | Feb. 23, 1943 |
| 2,314,707 | Katzin | Mar. 23, 1943 |
| 2,354,483 | Schock | July 25, 1944 |
| 2,358,391 | Ford | Sept. 19, 1944 |
| 2,368,351 | Ewen | Jan. 30, 1945 |
| 2,391,532 | Wilmotte | Dec. 25, 1945 |
| 2,392,384 | Howard | Jan. 8, 1946 |